US006629564B1

United States Patent
Ramakrishnan et al.

(10) Patent No.: US 6,629,564 B1
(45) Date of Patent: Oct. 7, 2003

(54) DOWNHOLE FLOW METER

(75) Inventors: Terizhandur S. Ramakrishnan, Bethel, CT (US); Gary M. Oddie, St. Neots (GB); Sam Smonian, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 111 days.

(21) Appl. No.: 09/672,471

(22) Filed: Sep. 28, 2000

Related U.S. Application Data
(60) Provisional application No. 60/195,831, filed on Apr. 11, 2000.

(51) Int. Cl.[7] ............................................. E21B 47/06
(52) U.S. Cl. ............................. 166/250.07; 73/152.31; 166/250.01; 166/313
(58) Field of Search ..................... 166/250.07, 250.01, 166/313; 73/152.29, 152.31, 152.52

(56) References Cited

U.S. PATENT DOCUMENTS

| | | |
|---|---|---|
| 2,371,658 A | 3/1945 | Stewart |
| RE28,464 E | 7/1975 | Bonnet |
| 3,913,398 A | 10/1975 | Curtis |
| 3,954,006 A | 5/1976 | Anderson et al. |
| 4,083,245 A | 4/1978 | Osborn |
| 4,221,134 A * | 9/1980 | Ekstrom, Jr. ................. 73/721 |
| 4,345,480 A | 8/1982 | Basham et al. |
| 4,452,077 A | 6/1984 | Siegfried, II |
| 4,803,873 A | 2/1989 | Ehlig-Economides |
| 4,905,203 A | 2/1990 | Sims et al. |
| 4,982,383 A | 1/1991 | Sims et al. |
| 5,259,239 A | 11/1993 | Gaisford |
| 5,337,821 A | 8/1994 | Peterson |
| 5,561,245 A | 10/1996 | Georgi et al. |
| 5,708,204 A | 1/1998 | Kasap |
| 5,831,156 A * | 11/1998 | Mullins .................... 73/152.18 |
| 5,889,213 A | 3/1999 | Guizot et al. |
| 5,970,801 A * | 10/1999 | Ciobanu et al. ......... 73/861.52 |
| 5,992,519 A | 11/1999 | Ramakrishnan et al. |
| 5,996,687 A | 12/1999 | Pringle et al. |
| 6,000,468 A | 12/1999 | Pringle |
| 6,082,455 A | 7/2000 | Pringle et al. |
| 6,227,302 B1 | 5/2001 | Pringle et al. |
| 6,328,112 B1 * | 12/2001 | Malone ....................... 166/386 |

FOREIGN PATENT DOCUMENTS

| | | |
|---|---|---|
| WO | WO 99/05478 | 2/1999 |
| WO | WO 99/10712 | 3/1999 |
| WO | WO 99/47895 | 9/1999 |
| WO | WO 99/60344 | 11/1999 |

OTHER PUBLICATIONS

Baker, Roger C., An introductory guide to flow measurement, 1989, pp. 55–75, Mechanical Engineering Publications Ltd., London.

(List continued on next page.)

*Primary Examiner*—Hoang Dang
(74) *Attorney, Agent, or Firm*—Trop, Pruner & Hu, P.C.; Jeffrey E. Griffin; Brigitte L. Jeffery

(57) ABSTRACT

This invention comprises the use of a variable orifice valve as a flow controller and flow meter. Pressure measurements are taken upstream and downstream of the variable orifice valve by way of a differential pressure measurement mechanism. The differential pressure measurement mechanism may comprise two separate absolute pressure measurement devices or a single differential pressure measurement device. Flow rate through the valve is determined from the pressure drop across the valve. In wellbores having multiple zones, a variable orifice valve together with a differential pressure measurement mechanism may be deployed for each zone. The flow rate through each of the zones and at the surface can then be monitored and controlled.

32 Claims, 2 Drawing Sheets

OTHER PUBLICATIONS

Goldstein, Richard J., Fluid Mechanics Measurements, pp. 292–294, Hemisphere Publishing Corporation, New York.

Muskat, Morris, Physical Principles of Oil Production, 1949, pp. 226–238, McGraw–Hill Book Company, Inc. New York.

Gunning, James; Paterson, Lincoln; Poliak, Boris; Coning in dual completed systems, 1999, pp. 27–39, Journal of Petroleum Science and Engineering.

Miller, Donald S., Internal flow systems, 1978, pp. 260–275, BHRA Fluid Engineering, Great Britain.

Miller, Richard W., Flow Measurement Engineering Handbook, Third Edition, 1996, pp. 7.1–9.29.

Waxman, M.H., Smits, L.J.M., Electrical conductivities in oil–bearing shaly sands, Jun. 1968, pp. 107–122, Society of Petroleum Engineers Journal.

Wojtanowicz, Andrew K., Hui, Xu, Bassiouni, Zaki, Segregated production method for oil wells with active water, 1994, pp. 21–35, Journal of Petroleum Engineering.

* cited by examiner

DOWNHOLE FLOW METER

This application claims priority under 35 USC 119(e) to U.S. Provisional Application Ser. No. 60/195,831 filed Apr. 11, 2000.

BACKGROUND

This invention relates generally to flow meters used in the downhole environment. Specifically, this invention relates to downhole flow meters that operate by measuring the pressure drop across a variable orifice valve.

Downhole flow metering is an essential component of reservoir monitoring. As the industry has moved toward permanent monitoring and control in real time, flow rate, pressure, temperature, resistivity, and watercut, among others, have become important components for assessing well performance.

To measure flow rates, a variety of sensors either on a standalone basis or in combination have been deployed. These include spinner tools, venturis, gradiomanometers, electromagnetic, acoustic, tracer detectors and gamma-ray sensors. However, these tools are expensive. Permanent downhole deployment of these sensors, especially when individual zone flow rates in multi-zone wells are desired, would require a large monetary investment.

Flow rate measurements may be used for a variety of purposes. The primary use is to help in quantifying produced fluids. In wellbores having multiple completions with feedback control, it may be desirable to set flow rates or pressure for the various zones so as to optimize the productivity. It is then necessary to measure the flow or pressure rate in each zone, compare them to a set point, and adjust the aperture openings in the valves of each zone completion in order to maintain flow rate or pressure as close to the desired value as possible.

SUMMARY

This invention comprises the use of a variable orifice valve as a flow controller and flow meter. Pressure measurements are taken upstream and downstream of the variable orifice valve (across the valve) by way of a differential pressure measurement mechanism. The differential pressure measurement mechanism may comprise two separate absolute pressure measurement devices or a single differential pressure measurement device. Flow rate through the valve is determined from the pressure drop across the valve. In wellbores having multiple zones, a variable orifice valve together with a differential pressure measurement mechanism may be deployed for each zone. The flow rate through each of the zones, in the completion tubing, and at the surface can then be monitored and controlled.

DETAILED DESCRIPTION

Figure 1:
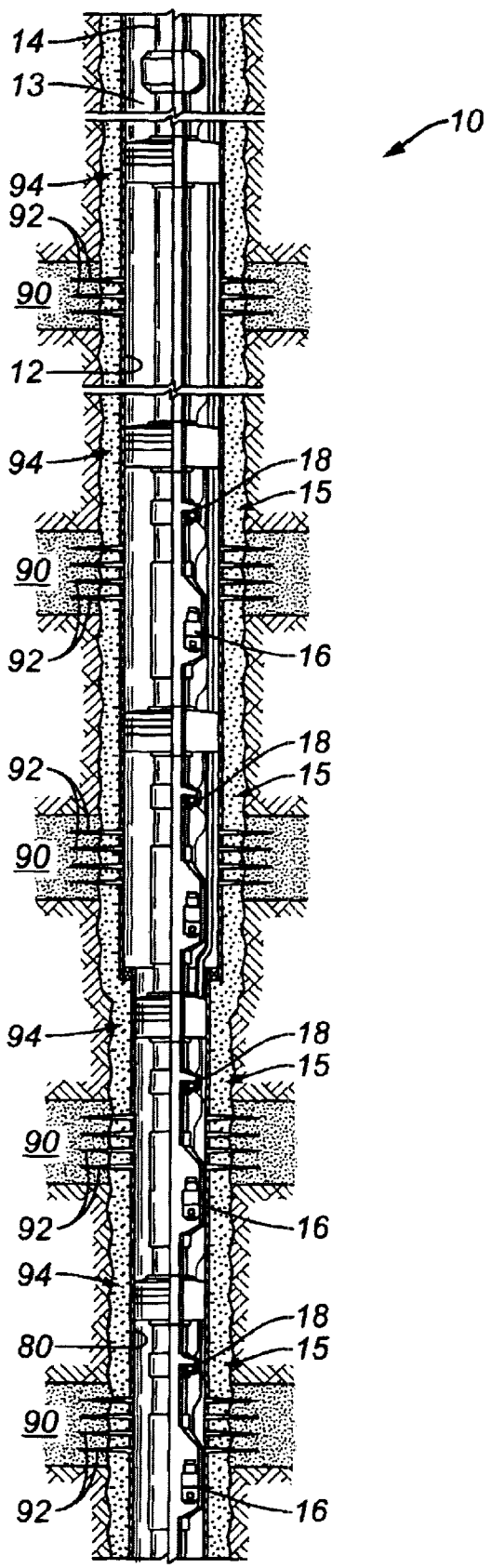
FIG. 1 is a view of a wellbore having multiple zones with a flow meter disposed for each zone.

FIG. 1 shows a wellbore 10 that may include a casing 12 or liner 80 and that includes a tubing string 14 disposed therein. An annulus 13 is defined exterior to the tubing string 14. FIG. 1 shows a plurality of zones 90 included in the wellbore 10. A flow meter 15 is incorporated into the tubing string 14 for each zone 90. Although FIG. 1 shows a wellbore 10 that includes multiple zones 90 (each having its own flow meter 15), it is understood that a single flow meter 15 may be disposed in a wellbore having only one zone 90 or that a single flow meter 15 may be disposed in a wellbore having multiple zones 90. It is also understood that a flow meter 15 may be disposed in the lateral bores of wellbores.

Each flow meter 15 is preferably proximate a formation 90. Typically, the wellbore 10 is perforated to provide fluid communication between each formation 90 and the wellbore 10 through perforations 92. Packers 94 are normally used to isolate each formation 90. The fluid flowing from a formation 90 and being measured by flow meter 15 may be in any of various phases, including single phase liquid or gas, two phase oil/water, two phase liquid/gas, or multi-phase.

A. Flow Meter

Figure 2:
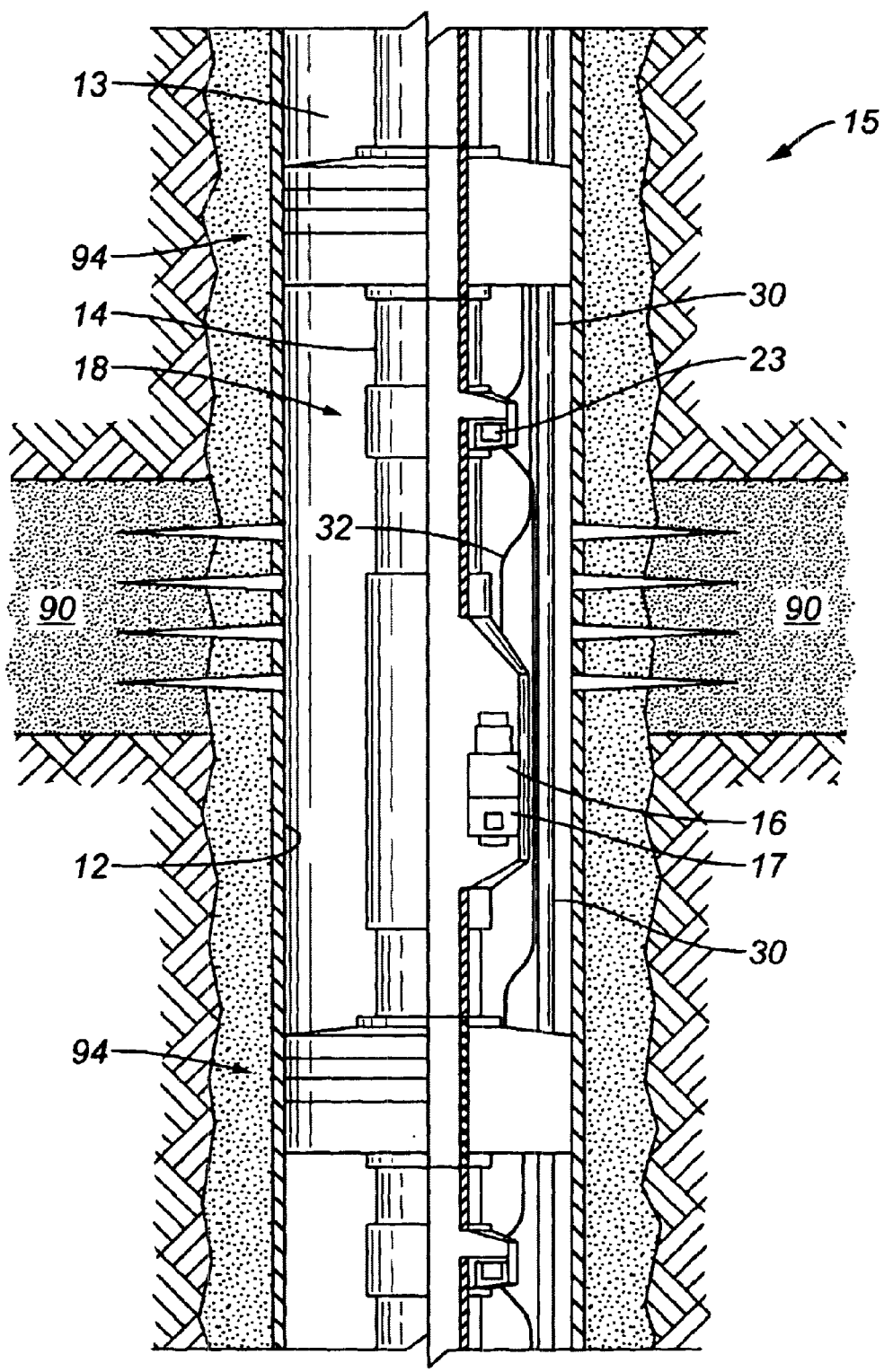
FIG. 2 is a cross-sectional view of the flow meter.

FIG. 2 shows the flow meter 15 in more detail. In general, the flow meter 15 of this invention comprises a variable orifice valve 16 and a differential pressure measurement mechanism 18.

In the embodiment shown in FIG. 2, variable orifice valve 16 comprises a side pocket sleeve valve 17. However, variable orifice valve 16 may also comprise other types of valves, such as disc valves and butterfly valves. In one embodiment as shown in the Figures, variable orifice valve 16 is installed in a side pocket mandrel. In other embodiments (not shown), variable orifice valve 16 is a part of the main bore of the tubing string 14.

Variable orifice valve 16 provides fluid communication between the annulus 13 and the interior of the tubing string 14 through at least one opening 19. Variable orifice valve 16 preferably includes a plurality of settings between fully closed and fully open, each setting exposing a different amount of surface area of the opening(s) 19 to flow and thus allowing a different flow volume through valve 16.

The differential pressure measurement mechanism 18 measures the pressure drop across the variable orifice valve 16. In one embodiment as shown in FIG. 2, the differential pressure measurement mechanism 18 comprises a differential pressure measurement device 23 located so that it can measure the pressure within the bore 24 of the tubing string 14 as well as within the annulus 13. Adequate differential pressure measurement devices 23 include differential pressure gauges, such as Schlumherger's gradiomanometer tool. In another embodiment (not shown), the differential pressure measurement mechanism 18 comprises a separate outer pressure measurement device and inner pressure measurement device, each comprising a measurement device such as an absolute pressure gauge. The outer pressure measurement device is located so that it measures the pressure within the annulus 13. Preferably, the outer pressure measurement device is located within the annulus 13 proximate the variable orifice valve 16. The inner pressure measurement device is located so that it measures the pressure within the bore 24 of the tubing string 14. Preferably, the inner pressure measurement device is located within the bore 24 of the tubing string 14 also proximate the variable orifice valve 16.

In one embodiment, each variable orifice valve 16 is controlled, as shown in FIG. 2, by hydraulic pressure from the surface through at least one hydraulic control line 30. In other embodiments (not shown), each variable orifice valve 16 may be controlled by electrical conduits, pressure pulse telemetry, acoustic telemetry, or electro-magnetic telemetry.

In one embodiment, each differential pressure measurement mechanism 18 is powered by at least one electrical conduit 32, which may also serve to transfer the readings of the mechanism 18 to the surface. In other embodiments (not shown), each differential pressure measurement mechanism 18 is powered by a battery located downhole, and the readings may be transferred to the surface by way of electrical conduits, pressure pulse telemetry, acoustic telemetry, or electromagnetic telemetry.

B. Liquid Flow Rate Equation

The flow rate of a single phase liquid across each variable orifice valve 16 can be determined by use of the following fluid dynamics Equation [1] or an equivalent thereof:

$$Q = CA\varepsilon \sqrt{\frac{2\Delta P}{\rho}}$$

where Q=flow rate, C=flow coefficient (this variable depends on a number of factors as will be explained herein), A=total area of variable orifice valve openings 19 that are exposed to flow, $\varepsilon$=expansibility factor, $\Delta P$=pressure drop, and $\rho$=upstream fluid density.

To calculate flow rate (Q) using Equation [1], the pressure drop ($\Delta P$) is measured from the downhole readings of the differential pressure measurement mechanism 18, as previously described. For single phase liquid flow, the expansibility factor ($\varepsilon$) can be approximated to equal 1.

The fluid density ($\rho$) can be determined based on the prevailing P, T and the PVT properties of the fluid. In one embodiment, the PVT calculation is performed by taking a relevant fluid sample downhole, bringing the sample to the surface, and analyzing it. In another embodiment, the relevant calculation is performed by flowing only the flow meter 15 that includes the relevant variable orifice valve 16, taking a sample of the fluid at the surface, and analyzing the sample at the surface. In yet another embodiment, the fluid density ($\rho$) can be obtained from a gradiomanometer measurement or other density measuring devices, such as gamma densitiometers and capacitance/resistance devices.

In one embodiment, the total area of exposed variable orifice valve openings (A) is determined by measurement at the surface. As previously stated, variable orifice valve 16 preferably includes more than one position between fully opened and fully closed. The total area of exposed variable orifice valve openings (A) should therefore be determined for each position or setting.

For valves having openings 19 that are identical, the total area of exposed variable orifice valve openings (A) can be represented by the following Equation [2]:

$$A = n_o a$$

where $n_o$ is the number of openings 19 that are exposed to the flow, and a is the area of each opening 19.

For a given stem position h of valve 16, the area (a) of each opening 19 exposed to the flow may be stated as a general Equation [3]:

$$a = f_a(h) \approx \gamma h^\alpha, \ \alpha > 0$$

where $\gamma$ and $\alpha$ are characterizing parameters and h is a variable representing the stem position of valve 16 for a given setting. The stem position variable (h) is known from the level of valve 16 actuation performed or from a position transducer mounted on valve 16. In general, Equation [3] may drift with time due to erosion. Unfortunately, the erosion process is not adequately captured by parameters $\gamma$ and $\alpha$. For example, erosion may affect the fully opened or fully closed positions more than some intermediate settings.

Therefore, a more general monotonic function may be preferable. A reasonable Equation [4] to use is:

$$\frac{a}{a_0} = \frac{x_h^z}{\sqrt{(v + (1-v)x_h^{2z})}}$$

where $a_o$ is the area per opening when the valve 16 is in the fully open position, $X_h$ is the fractional stem movement which equals $h/h_{max}$, and v and z are characterizing parameters.

The remaining parameter required to determine flow rate using Equation [1] is the flow coefficient (C), which is dependent on the following parameters:

$$C = C_f\left(Re, \frac{A_u}{a}, \frac{A_d}{a}, pressure \cdot tap \cdot locations\right)$$

where Re is the Reynold's Number defined at a reliable position (for example the throat), $A_u$ is the area upstream of valve 16 (the area exposed to the formation), and $A_d$ is the area downstream of valve 16 (approximately equal to the cross-sectional area of the tubing string bore 24).

Since the flow coefficient (C) cannot be calculated with any certainty using equations, it must be determined through experimentation and/or mathematical modeling. The flow coefficient must be determined for each setting of valve 16. The flow coefficient (C) can be experimentally determined when the flow meter 15 is already downhole or prior to downhole deployment of the flow meter 15.

To conduct the experiment when the flow meter 15 is already in the downhole environment, the variable orifice valve 16 of the relevant flow meter 15 is opened to one of its settings thus allowing flow of fluids through the variable orifice valve 16, within tubing string 14, and to the surface. If more than one flow meter 15 is included in the wellbore, only the variable orifice valve 16 of the flow meter 15 being characterized is opened. The flow rate (Q) of the fluid is then measured at the surface or by an independent flow metering device downstream (e.g. spinner, etc.). Knowing the values of all the relevant variables of Equation [1], Equation [1] is solved for the flow coefficient (C). This procedure is repeated for each setting of valve 16 (and for each valve 16).

To conduct the experiment prior to the downhole deployment of the flow meter 15, the flow meter 15 is connected to a laboratory simulator or a flow loop, wherein the flow of fluids through the variable orifice valve 16 is simulated. All of the relevant variables of Equation [1] will be known or measurable, including the flow rate (Q). Knowing the values of all the relevant variables of Equation [1], Equation [1] is solved for the flow coefficient (C). This procedure is repeated for each setting of valve 16 (and for each valve 16).

C. Flow Rate Calculation

In general, formation fluid flows from a formation 90, through perforations 92, into the annulus 13, through the variable orifice valve 16 (at a specified setting), and into the bore 24 of the tubing string 14. The fluid then flows within bore 24 to the surface of the wellbore 10.

The calculation of flow rate across a single flow meter 15 disposed in a flowing wellbore 10 is straight forward. Essentially, the pressure readings from the differential pressure measurement mechanism 18 are taken real-time or at designated intervals and are transmitted to the surface. The flow coefficient (C), total area of variable orifice valve openings 19 that are exposed to flow (A), expansibility factor ($\varepsilon$), and upstream fluid density ($\rho$) are each determined by the methods previously stated. It is noted that the flow coefficient (C) and the total area of variable orifice valve openings 19 exposed to flow (A) are different for each setting of valve 16. Knowing each of these variables, Equation [1] can then be easily applied to get the flow rate (Q) through the valve.

In one embodiment, the pressure readings from the differential pressure measurement mechanism 18 are transmitted to a surface processor, such as a computer. The surface processor also stores Equation [1] and its relevant other variables and can thus calculate the flow rate through the relevant valve 16 by using Equation [1], as previously disclosed.

In another embodiment, the pressure readings from the differential pressure measurement mechanism 18 are recorded within a recorder deployed downhole. The readings may be subsequently retrieved to the surface and plugged into Equation [1].

In those embodiments including more than one flow meter 15 such as that shown in FIG. 1, the pressure downstream of each valve 16 is related to the flow entering through the valve 16 and the main flow passing through the tubing string 14. Thus the downstream pressure at each valve 16 controls both the flow through the valve 16 and the total flow up to that point in the tubing string 14. Consequently, the flow through each valve 16 is intimately related to the others. Preferably, a mathematical flow model of the whole wellbore 10 is designed, incorporating the required flow rates, formation pressures, valve settings, well head pressure, valve losses and pipe losses. This model is utilized to predict the flow rate and the pressure throughout the wellbore 10.

D. Gas Flow Rate Equation and Calculation

The flow rate of a single phase gas flow across each variable orifice valve 16 can also be determined by use of Equation [1] or an equivalent thereof. However, unlike the calculation for single phase liquid flow wherein the expansibility factor ($\epsilon$) can be approximated to equal 1, the expansibility factor ($\epsilon$) for single phase gas flow cannot be approximated and must be determined. For single phase gas flow, the expansibility factor ($\epsilon$) is determined based on the prevailing P, T and the PVT properties of the fluid. In one embodiment, the PVT calculation is performed by taking a relevant fluid sample downhole, bringing the sample to the surface, and analyzing it. In another embodiment, the relevant calculation is performed by flowing only the flow meter 15 that includes the relevant variable orifice valve 16, taking a sample of the fluid at the surface, and analyzing the sample at the surface.

The remainder of the flow rate calculation for single phase gas flow is the same as the flow rate calculation for single phase liquid flow, as detailed in Sections B and C herein.

E. Oil/Water Flow Rate Equation and Calculation

For flow having oil and water content, experiments have shown that a few diameters downstream of a venturi flow meter, the flow is well mixed, i.e., in water-oil flow, and that the slip velocity is negligible compared to either phase velocity. The holdup is then equal to the fractional flow of the phases. For the drop sizes of the entrained phase, we are expected to have negligible pressure difference between the phases. Therefore, substituting the average density $\rho_e$ for $\rho$ in Equation [1] gives the flow rate equation for oil/water flow. The average density ($\rho_e$), in turn, can be calculated by the following Equation [5]:

$$\rho_e = \rho_w S_w + \rho_o (1 - S_w)$$

where $S_w$ is the water holdup (approximately equal to its flow fraction), $\rho_w$ is the density of the water content in the flow, and $\rho_o$ is the density of the oil content in the flow. In one embodiment, the water content density ($\rho_w$), the oil content density ($\rho_o$), and the water holdup ($S_w$) are calculated by techniques and tools known to the prior art. In another embodiment, a differential pressure measurement along the flowline downstream of the orifice can provide an estimate of the average density ($\rho_e$). The differential pressure measurement can be obtained by use of standard production logging application tools, such as Schlumberger's Gradio Venturi Meter tool or other fluid density measuring devices, such as gamma densiotemeters and capacitance/resistance devices. Then, the following Equations [6] can be used as a simple first approximations of the oil content flow rate and the water content flow rate:

$$q_w = q S_w \text{ and } q_o = q(1 - S_w)$$

The remainder of the flow rate calculation for flow that includes oil and water content is the same as the flow rate calculation for single phase liquid flow, as detailed in Sections B and C herein.

F. Flow Rate Equation and Calculation for Other Phases

For flow having other types of phasing, such as two phase liquid/gas or multi-phase fluid, the flow rate across valve 16 can also be determined by use of Equation [1] or an equivalent thereof. As previously mentioned with respect to the fluid phases described in Sections B-E herein, the variables of Equation [1], including the expansibility factor ($\epsilon$) and the density ($\rho$) or equivalent density ($\rho_e$), can be determined using tables, known instruments, and/or calibration. Once the variables of Equation [1] are determined sing such methods for the relevant fluid, the remainder of the flow rate calculation is the same as the flow rate calculations described previously.

G. Subsequent Calibration

The total area of exposed variable orifice valve openings (A) and the flow coefficient (C) are likely to vary over a period of time due to erosion of the valve openings 19, among other things. Thus, to maintain the reliability of the flow rate (Q) calculation, the total area of exposed variable orifice valve openings (A) and the flow coefficient (C) should be re-calibrated from time to time.

In order to re-calibrate such variables, the variable orifice valve 16 of the relevant flow meter 15 is opened and the surface flow rate (Q) is measured. If the wellbore includes more than one flow meter 15, only the variable orifice valve 16 of the relevant flow meter 15 should be opened. All other valves 16 should remain closed.

If Equation [2] is used to calculate the total area of exposed variable orifice valve openings (A) for the relevant variable orifice valve 16, then Equations [1] and [2] can be combined into the following Equation [6]:

$$Q = C n_0 a \epsilon \sqrt{\frac{2 \Delta P}{\rho}}$$

The variable orifice valve 16 is opened to each of its settings and the surface flow rate (Q) is measured at each setting. Equation [6] is then solved for the product of the flow coefficient (C) and the area ($\alpha$) of each opening 19 for each of the settings of variable orifice valve 16 (note $n_o$ is a known variable). This technique can also be used when, as in Equation [1], only the variable (A) is used (instead of also using Equations [2], [3], or [4]), wherein Equation [1] would be solved for the product of the flow coefficient (C) and the total area of exposed variable orifice valve openings (A) for each setting of valve 16.

If Equation [3] is used to calculate the total area of exposed variable orifice valve openings (A) for the relevant variable orifice valve 16, then Equations [1] and [3] can be combined into the following Equation [7]:

$$Q = Cn_0 \gamma h^\alpha \varepsilon \sqrt{\frac{2\Delta P}{\rho}}$$

The variable orifice valve 16 is then opened to two distinct settings and the surface flow rate (Q) is measured for each of the two settings. With two Equations [7] (one for each setting), the desired parameters $C\gamma$ and $\alpha$ can be calculated thus providing the re-calibrated values.

If Equation [4] is used to calculate the total area of exposed variable orifice valve openings (A) for the relevant variable orifice valve 16, then Equations [1] and [4] can be combined into the following Equation [8]:

$$Q = \frac{Cn_0 \varepsilon a_0 x_h^z}{\sqrt{v + (1-v)x_h^{2z}}} \sqrt{\frac{2\Delta P}{\rho}}$$

The variable orifice valve 16 is then opened to three distinct settings and the surface flow rate (Q) is measured for each of the three settings. With three Equations [8] (one for each setting), the desired parameters C, z, and v can be calculated thus providing the re-calibrated values.

In any case, a venturi may also be included in the tubing string 14 above all of the zones 90. The venturi measures the total flow from all zones 90. By testing each zone 90 individually (as above), the flow measured across each valve 16 may then be compared to the theoretical flow and the venturi flow, which comparison (with the aid of time lapse trending) would provide an indication of the performance of the valve, including the effects of erosion or hysterisis.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A method for measuring the flow rate of a fluid in a wellbore, comprising:
   flowing the fluid through a variable orifice valve having one or more orifices between an annular region outside a tool string and a region inside the tool string;
   measuring the pressure differential of the fluid across the variable orifice valve; and
   calculating the flow rate through the variable orifice valve by use of the pressure differential measurement.

2. The method of claim 1, further comprising:
   determining the flow coefficient and the total area of the variable orifice valve openings that are exposed to flow ("the total area");
   determining the expansibility factor and the fluid density of the fluid flowing through the variable orifice valve; and
   calculating the flow rate through the variable orifice valve by use of the pressure differential measurement, the flow coefficient, the total area, the expansibility factor, and the fluid density.

3. The method of claim 2, wherein the determining the expansibility factor and the fluid density step comprises performing a PVT calculation of the fluid.

4. The method of claim 2, wherein the determining the expansibility factor and the fluid density step comprises determining the fluid density by taking a gradiomanometer measurement of the fluid.

5. The method of claim 3, wherein the determining the expansibility factor and the fluid density step further comprises approximating the expansibility factor to equal 1.

6. The method of claim 1, wherein the fluid is a singe phase liquid.

7. The method of claim 1, wherein the fluid is a single phase gas.

8. The method of claim 1, wherein the fluid includes a water and an oil content.

9. The method of claim 2, wherein the fluid includes a water and an oil content.

10. The method of claim 1, wherein the fluid is a two phase liquid and gas flow.

11. The method of claim 1, wherein the fluid is a multi phase flow.

12. The method of claim 9, wherein the determining the expansibility factor and the fluid density step comprises determining the fluid density by utilizing the equation $$\rho = \rho_w S_w + \rho_o (1 - S_w)$$

to solve for $\rho$, wherein $(S_w)$ is the water holdup, $(\rho_w)$ is the density of the water content in the flow, and $(\rho_o)$ is the density of the oil content in the flow.

13. The method of claim 9, wherein the determining the expansibility factor and the fluid density step comprises estimating the fluid density by taking a differential pressure measurement along the flowline downstream of the valve.

14. The method of claim 1, wherein the measuring the pressure differential step comprises measuring the pressure upstream of the variable orifice valve with an outer pressure measurement device and measuring the pressure downstream of the variable orifice valve with an inner pressure measurement device.

15. The method of claim 1, wherein the measuring the pressure differential step comprises measuring the pressure upstream and downstream of the variable orifice valve with a differential pressure measurement device.

16. The method of claim 1, further comprising:
   placing the variable orifice valve in a side pocket of a side pocket mandrel.

17. The method of claim 16, wherein flowing the fluid through the variable orifice valve comprises flowing the fluid through a valve selected from the group consisting of a side pocket sleeve valve, a disc valve, and a butterfly valve.

18. A method for measuring the flow rate of a fluid in a wellbore, comprising:
   flowing the fluid through a variable orifice valve;
   measuring the pressure differential of the fluid across the variable orifice valve;

determining the flow coefficient and the total area of variable orifice valve openings that are exposed to flow; and calculating the flow rate through the variable orifice valve by use of the pressure differential measurement, the flow coefficient, and the total area, wherein the determining the flow coefficient and the total area step comprises determining the flow coefficient and the total area for each setting of the variable orifice valve.

19. The method of claim 18, wherein the determining the flow coefficient and the total area step comprises characterizing the total area using the equation $A = n_o \alpha$, wherein (A) equals the total area, ($n_o$) is the number of the valve openings that are exposed to flow, and ($\alpha$) is the area of each of the valve openings.

20. The method of claim 19, wherein the characterizing step further comprises utilizing the equation $\alpha = \gamma h^\alpha$ to solve for ($\alpha$), wherein $\gamma$ and $\alpha$ are characterizing parameters and h is a variable representing the stem position of the valve for a given setting.

21. The method of claim 19, wherein the characterizing step further comprises:

utilizing the equation $$\frac{a}{a_0} = \frac{x_h^z}{\sqrt{(v + (1-v)x_h^{2z})}}$$

to solve for ($\alpha$), wherein ($\alpha_o$) is the area per opening when the valve is in the fully open position, ($X_h$) is the fractional stem movement of the valve which equals $h/h_{max}$ (with (h) being a variable representing the stem position of the valve for a given setting), and v and z are characterizing parameters.

22. The method of claim 18, wherein the determining the flow coefficient and the total area step comprises determining the flow coefficient prior to deployment into the wellbore.

23. The method of claim 22, wherein the flow coefficient is determined by connecting the variable orifice valve to a laboratory simulator that simulates flow of downhole fluids.

24. The method of claim 18, wherein the determining the flow coefficient and the total area step comprises determining the flow coefficient while the valve is deployed in the wellbore.

25. The method of claim 24, wherein the flow coefficient is determined by utilizing the equation $$Q = CA\varepsilon\sqrt{\frac{2\Delta P}{\rho}}$$

to solve for (C), wherein (Q) is the flow rate, (C) is the flow coefficient, (A) is the total area, ($\epsilon$) is the expansibility factor, ($\Delta P$) is the pressure drop across the valve, and ($\rho$) is the upstream fluid density.

26. A method for measuring the flow rate of a fluid in a wellbore, comprising:

flowing the fluid through a variable orifice valve;

measuring the pressure differential of the fluid across the variable orifice valve;

determining the flow coefficient and the total area of variable orifice valve openings that are exposed to flow;

calculating the flow rate through the variable orifice valve by use of the pressure differential measurement, the flow coefficient, and the total area; and calibrating the flow coefficient and the total area, wherein the calibrating step comprises calibrating the flow coefficient and the total area for each setting of the variable orifice valve.

27. The method of claim 26, wherein the calibrating step comprises calibrating the flow coefficient and the total area while the valve is deployed in the wellbore.

28. The method of claim 27, wherein the calibrating step takes place without shutting in the wellbore.

29. The method of claim 27, wherein the wellbore includes a plurality of producing formations and the calibrating step comprises closing each of the producing formations except for the producing formation in fluid communication with the variable orifice valve.

30. A method for measuring the flow rate of a fluid in a wellbore, comprising:

flowing the fluid through a variable orifice valve;

measuring the pressure differential of the fluid across the variable orifice valve;

calculating the flow rate through the variable orifice valve by use of the pressure differential measurement;

determining the flow coefficient and the total area of the variable orifice valve openings that are exposed to flow ("the total area");

determining the expansibility factor and the fluid density of the fluid flowing through the variable orifice valve;

calculating the flow rate through the variable orifice valve by use of the pressure differential measurement, the flow coefficient, the total area, the expansibility factor, and the fluid density; and calibrating the flow coefficient and the total area, wherein the calibrating step comprises calibrating the flow coefficient and the total area for each setting of the variable orifice valve, and, wherein the calibrating step comprises determining the product of the flow coefficient and the total area by utilizing the equation $$Q = CA\varepsilon\sqrt{\frac{2\Delta P}{\rho}}$$

to solve for (C), wherein (Q) is the flow rate, (C) is the flow coefficient, (A) is the total area, ($\epsilon$) is the expansibility factor, ($\Delta P$) is the pressure drop across the valve, and ($\rho$) is the upstream fluid density.

31. A method for measuring the flow rate of a fluid in a wellbore, comprising:

flowing the fluid through plural variable orifice valves;

measuring the differential pressure of the fluid across each of the variable orifice valves, and calculating flow rate in a tubing string based on the differential pressure measurements across corresponding variable orifice valves.

32. The method of claim 31, further comprising providing each variable orifice valve in a side pocket of a respective side pocket mandrel.

\* \* \* \* \*

UNITED STATES PATENT AND TRADEMARK OFFICE
CERTIFICATE OF CORRECTION

PATENT NO.    : 6,629,564 B1
DATED         : October 7, 2003
INVENTOR(S)   : Ramakrishnan et al.

It is certified that error appears in the above-identified patent and that said Letters Patent is hereby corrected as shown below:

<u>Title page,</u>
Item [74], Inventors, delete "Smonian" and insert -- Simonian --.

<u>Column 3,</u>
Line 37, delete "densitiometers" and insert -- densitometers --.

<u>Column 4,</u>
Line 61, delete "straight forward" and insert -- straightforward --.

<u>Column 5,</u>
Line 29, delete "well head" and insert -- wellhead --.

<u>Column 6,</u>
Line 13, delete "densiotemeters" and insert -- densitometers --.

Signed and Sealed this

Sixteenth Day of December, 2003

JAMES E. ROGAN
*Director of the United States Patent and Trademark Office*